United States Patent [19]

Anderman et al.

[11] Patent Number: 4,654,281
[45] Date of Patent: Mar. 31, 1987

[54] COMPOSITE CATHODIC ELECTRODE

[75] Inventors: Menahem Anderman, Boyds; Joseph T. Lundquist, Jessup, both of Md.

[73] Assignee: W. R. Grace & Co., New York, N.Y.

[21] Appl. No.: 842,973

[22] Filed: Mar. 24, 1986

[51] Int. Cl.$^4$ ............................................. H01M 4/02
[52] U.S. Cl. .................................... 429/209; 429/212; 429/232; 429/218; 429/137
[58] Field of Search ............... 429/209, 212, 217, 232, 429/218, 196, 247, 137, 139

[56] References Cited

U.S. PATENT DOCUMENTS 4,416,915 11/1983 Palmer et al. .................... 429/218 X
4,529,672 7/1985 Howard et al. ................. 429/217 X
4,560,632 12/1985 Alberto .......................... 429/232 X Primary Examiner—Anthony Skapars
Attorney, Agent, or Firm—Howard J. Troffkin

[57] ABSTRACT

A cathodic electrode product comprising a substantially unitary, microporous structure wherein each major surface of said structure is a composition of an inert filler in a polyolefin matrix, the inner core of said structure is a composition of from 70–98 weight percent of electrochemically active and electrically conductive particulate material, from 2–30 weight percent polyethylene and from 0 to 5 weight percent polyethylene plasticizer and a current collector in contact and extend from the inner core composition.

20 Claims, No Drawings

COMPOSITE CATHODIC ELECTRODE

BACKGROUND OF THE INVENTION

The present invention is directed to a sheet product and to cathodic electrode products for non-aqueous battery formed from said sheet product.

Storage batteries have a configuration composed of at least one pair of electrodes of opposite polarity and, generally, a series of adjacent electrodes of alternating polarity. The current flow between electrodes is maintained by an electrolyte composition capable of carrying ions across electrode pairs. In addition to these active components, there must be an inert material separating the electrodes of opposite polarity. Separators have been used in many forms including grids, blocks, sheets and the like formed from nonconductive materials.

Non-aqueous batteries have certain distinct advantages over other types of storage batteries. They use, as anodes, light weight metals, normally composed of alkali metals or their alloys such as lithium, or lithium-aluminum alloys and the like which are at the far end of the electromotive series. These batteries have the potential for providing much higher gravimetric and volumetric energy densities (capacity per unit weight and volume, respectively) than other types of batteries due to the low atomic weight of the metal and high potential for forming a battery in conjunction with suitable positive electrodes far removed from the light weight metal electrode (the description herein will use batteries having lithium as the light weight metal anode although other light weight batteries having lithium as the light weight metals can be used) in the electromotive series. The battery can be formed in any conventional physical design, such cylindrical, rectangular or disc-shaped "button" cells, normally of a closed cell configuration.

The battery components of positive electrode, negative electrode and separator can be in the form of distinct alternating plates in a sandwich design or of a continuous spirally wound design as are well known. The anodic electrodes can be formed, for example, from a light metal, such as lithium or its alloys, on a support, such as a nickel coated screen. The electrolyte can be formed of a non-aqueous solvent, fused or solid electrolyte. Illustrative of known useful non-aqueous solvents include acetonitrile, tetrahydrofuran and its derivatives, propylene carbonate, various sulfones and mixtures of these solvents containing a light metal salt such as lithium salts, as for example lithium perchlorate, iodide or hexafluroarsenate and the like.

The cathodes are normally formed with one or more metal chalcogenide compound such as sulfides, selenides, selenides and tellurides of titanium, vanadium, hafnium, niobium, zirconium and tantalum. Typically the chalcogenide active materials are produced in particulate form and pelletized or chemically bound up to form a cathode structure configuration. One of the most common manners of binding the cathode active material involves the use of Teflon [poly(tetrafluoroethylene)] as the principal or sole binding agent. Teflon bonded cathodes have certain drawbacks which limit their ability to provide a highly effective cathodic electrode. For example, they are fabricated from aqueous slurries which both limits the type of chalcogenides that can be used (the most desired chalcogenide, $TiS_2$, is unstable to water) and is a cause for concern when used in batteries having a light metal anode, such as lithium. Further, Teflon formed cathode products are rigid structures not suitable for formation into a variety of desired shapes and configurations. Patents illustrating this technology include U.S. Pat. Nos. 3,457,113; 3,407,096; 3,306,779; 3,184,339 and 3,536,537.

Other polymer binders have also been suggested to aid in forming chalcogenide cathodic electrodes. For example, EDPM (ethylene-propylene-diene terpolymer) and sulfonated ionomers have been used to form cathodic electrodes by slurry processes. Although the resultant electrodes exhibit greater elasticity and flexibility, they still have major defects of non-uniformity, poor control of pore size distribution and porosity and severe loss of activity after being subjected to only a few charge/discharge cycles as shown by the low figure of merit reported in U.S. Pat. No. 4,322,317 which illustrates this technology.

Finally, an important component of a battery is the separator. This component is normally in the form of a separate sheet material inserted between electrodes of opposite polarity to prevent their contacting one another. In batteries, such as presently described, the separator must be inert with respect to the other components, be capable of permitting electrolytic conduction through the separator and, in secondary batteries, it must be able to inhibit and prevent dendritic shorting. Because of the types of polymers used in forming the cathodic electrodes, especially inert Teflon, the separator has been a separate component. This causes additional effort in assembling the cell. Further, its effectiveness is impaired as the separator tends to shrink or migrate thus allowing exposed areas of electrodes. Finally, such individual separator membranes do not provide a means of effectively inhibiting dendrite formation and shorting therefrom. Normally, the edge portions of the electrodes remain exposed to permit dendrite shorting. To overcome this, it has been proposed that the light metal electrode be encapsulated by a separator type envelope. However, this has many complications due to the high reactivity of the light metal, especially lithium.

It is highly desired to form a sheet product suitable for use in forming a cathodic electrode product composed of a polymer-bonded cathodic electrode which is integrally bonded to and encompassed by a composition capable of functioning as an inert microporous separator membrane. It is further highly desired that the sheet product and the cathodic electrode product have good mechanical integrity, be flexible and capable of being formed into various configurations required for different battery designs. It is still further highly desired that cathodic electrode product permit high utilization of the active material and maintain the high activity after subjection to a multiplicity of charge/discharge cycles.

SUMMARY OF THE INVENTION

The present invention is directed to a microporous sheet product and to a unitary chalcogenide cathodic electrode-separator product formed using the sheet product, wherein the electrode product comprises an inner core having a composition of from 2–30 weight percent polyethylene having a weight average molecular weight of at least 150,000, 70–98 weight percent of electrically conductive and electrochemically active particulate material and from 0–5 weight percent of an organic plasticizer for the polyethylene;

an outer portion forming each of the two major surfaces of the sheet product composed of a composition of from about 7–36 weight percent polyolefin having weight average molecular weight of at least 100,000, from about 50–93 weight percent of an inert filler and from 0–15 weight percent of a placticizer for said olefin; and an electronically conductive material in intimate contact and extending from the inner core composition.

DETAILED DESCRIPTION OF THE INVENTION

The present invention is directed to a sheet product suitable for use in forming a chalcogenide cathodic electrode product.

For clarity, the present invention shall be described using certain terms which shall be defined hereinbelow:

"sheet" or "membrane" shall mean a broad substantially planer material having major surfaces and edges defining its length, breadth and thickness. The sheet may be inert or passive with respect to an electrochemical reaction or may be formed with electrochemically active and electrically conductive material(s).

"First sheet" or "core material" shall refer to a composition containing a high percentage of cathodic electrochemically active and electrically conductive particulate material or mixture of materials.

"Second sheet" or "outer surface material" shall refer to a composition which is substantially inert and passive with respect to the electrochemical reaction of a light metal containing battery cell.

"Sheet product" shall mean a unitary sheet material formed from at least one first sheet and at least one second sheet.

"Electrochemically active" shall refer to material which is capable of undergoing redox reaction with an alkali metal, especially Li, (a Group 1A metal of the Periodic Chart of Elements) under the conditions encountered by a battery cell in which the material is contained.

"Electrically conductive" or "electronically conductive" shall refer to material which is capable of exhibiting electronic conductivity of at least $10^{-2}$ ohm$^{-1}$ cm$^{-1}$.

"Current collector" shall mean a screen, foil, grid, web, woven or non-woven fabric or the like formed from an efficient electronically conductive material such as carbon or a conductive metal.

"Electrode product" shall mean a unitary, microporous sheet having a core formed from a composition of at least one first sheet, at least one current collector in intimate contact with the composition of the first sheet and each major surface of the unitary microporous sheet composed of a composition of a second sheet which is in intimate contact and bonded to the first sheet composition.

The first sheet or core of the subject cathodic electrode is generally formed by initially blending a uniform admixture of polyethylene, plasticizer for the polyethylene and particulate material composed of chalcogenide material alone or with other particulate material, as described hereinbelow. The polyethylene should be of high density and have a weight average molecular weight of at least about 150,000 and is preferably selected from higher molecular weights such as from about 200,000 to 5,000,000. The most preferred polyethylenes are homopolymers of high molecular weight such as of a weight average molecular weight of 200,000 to 500,000. Although homopolymers are preferred, the term "polyethylene", as used herein and in the appended claims, shall (unless specifically defined otherwise) mean both polyethylene homopolymers and its copolymers formed with an additional olefinic monomer, such as propylene, acrylate and the like with the major (preferably at least 80 percent) olefinic monomer being ethylene or mixtures of such polymers. The polyethylene component can be a mixture of a high and low molecular weight polyethylene. It is preferred that the mixture contain a major amount (most preferably greater than 70 weight percent) of high molecular weight polymer. The term "high molecular weight polymer" is intended to refer to a polymer having a weight average molecular weight of at least 250,000 and "low molecular weight polymer" refers to a polymer having a weight average molecular weight of from about 100,000 to less than 250,000.

Plasticizers used in forming the first sheet must be capable of plasticizing polyethylene and be substantially soluble in an organic solvent which is a non-solvent with respect to the polymer and particulate materials used in forming the sheet product and the cathodic electrode as further described below. The plasticizer should be substantially free of water (anhydrous) and, therefore, compatible with the subject battery system. In addition, the plasticizer should be inert with respect to the particulate material.

Representatives of such plasticizers are organic esters, such as sebacates, phthalates, stearates, adipates and citrates; epoxy compounds such as epoxidized vegetable oil; phosphate esters such as tricresyl phosphate; hydrocarbon materials such as petroleum oil including lubricating oils and fuel oils, hydrocarbon resin and asphalt and pure compounds such as eicosane; coumarone-indene resins and terpene resins; tall oil and linseed oil. The preferred plasticizers are hydrocarbon materials and most preferred plasticizers are selected from petroleum oils.

The particulate material required to form the first sheet of the present invention may be any known chalcogenide or mixtures thereof, and includes, but should not be limited to, one or more of the chalcogenide compounds selected from the group consisting of the sulfides, the selenides, and the tellurides of titanium, zirconium, hafnium, niobium, tantalum, molybdenum and vanadium. In general, such chalcogenides contain about 1.8 to about 3.2 atoms of the chalcogen per metal atom. It is desirable that the chalcogenide be of one or more metals selected from titanium and vanadium. Preferred are the titanium chalcogenides. Among the chalcogens employed, sulfur and selenium are desired, and sulfur is preferred.

Examples of cathode-active materials which may be useful and which are selected from the above-mentioned chalcogenides are titanium disulfide, zirconium disulfide, hafnium disulfide, niobium triselenide, tantalum disulfide, molybdenum trisulfide, vanadium disulfide, vanadium diselenide and vanadium ditelluride. Also included are the chalcogenides having more than one of the mentioned metals, e.g., $V_{0.25}Ti_{0.75}S_2$. Also included are those chalcogenides having metals other than those described above included, e.g., vanadium iron disulfide. Titanium disulfide is the most preferred chalcogenide to be used in forming the first sheet or core of the resultant electrode product. The titanium disulfide is preferably used in at least about 70 and most preferably substantially 100 weight percent of the chalcogenide contained in the first sheet.

The first sheet can further contain as part of the particulate material therein a conductive diluent to further enhance the electrically conductive properties of the first sheet. An example of such diluent is high surface area carbon black. The amount of conductive diluent, when used, should not exceed about 30 weight percent and preferably about 20 weight percent of the particulate material used.

The mean particle size of the chalcogenide should be about 25 and preferably 15 microns or less. The mean particle size of conductive diluent used should be of ultrafine particle size such as of from 1 to 100 millimicrons with a (BET) surface area of at least about 40 $m^2/gm$ and preferably at least about 70 $m^2/gm$.

The above-described components used to form the first sheet can be readily formed into a substantially homogeneous admixture by initially blending from about 5 to 35 (preferably 5-20) volume percent polymer, from about 25 to 75 (preferably 40-60) volume percent of particulate material and from about 20 to 50 volume percent of polymeric plasticizer. The amounts of each component can be adjusted by the formulator to provide sufficient plasticizer to enhance processability and provide for desired microporosity while limiting the polymer-particulate ratio to provide a resultant sheet having very low ratio of polymer to particulate material. The first sheet after removal of plasticizer, as described below, should have a composition of from 2-30 (preferably 4-15) weight percent polyethylene; from 70-98 (preferably 85-96) weight percent electrochemically active and electrically conductive particulate material; and from 0-5 (preferably from 0 to 2) weight percent of plasticizer for the polyethylene.

A second sheet or outer surface material of the subject electrode is formed from an initial blend of a polyolefin, an inert filler and a plasticizer for the polyolefin. The polyolefin is preferably polyethylene or polypropylene of high density. The most preferred material is a polyethylene which is the same as or similar to that used in forming the first sheet of the same resultant sheet product. The polyolefin should have a weight average molecular weight of at least 100,000, preferably from 150,000 to 2,000,000 and most preferably from 150,000 to 500,000. The polyolefin can be a homopolymer or copolymer formed from a mixture of hydrocarbon olefinic monomers or with other olefinic monomers such as acrylic acid or esters. Representative of polyolefins which may be used are polyethylene, polypropylene, polybutene, ethylene-propylene copolymer, ethylenebutene copolymer, ethylene-acrylic acid copolymer and the like. Further, the polyolefin can be a mixture of two or more polyolefins of similar or different weight average molecular weight. For example the mixture can be composed of a high (greater than 500,000) and a low (100,000–500,000) molecular weight polymers.

The plasticizer for the polyolefin of the second sheet must be an organic material which is substantially free of water (anhydrous). Examples given above with respect to the first sheet are applicable here. It is preferred that the second and first plasticizers have similar solubility characteristics. That is that they are soluble in a common organic solvent which is a non-solvent and inert with respect to the other components of the resultant sheet product.

The second sheet product should contain a filler which is inert and passive with respect to the other components of the resultant sheet product and passive with respect to the electrochemical reaction of a nonaqueous battery cell, such as a lithium battery. Examples of suitable inert and passive filler material include metal oxides such as those of silicon, aluminum, calcium, magnesium, barium, iron, zinc and tin; minerals such as mica, attapulgite, kaolite, talc, deatomaceous earth and the like; precipitated metal silicates, such as calcium silicate and aluminum polysilicate; glass particles and the like. The most preferred materials are selected from titania, alumina and silica. It is preferred that the inert materials should have a particle size of from about 0.01 to about 10 microns in diameter and have a surface area of from about 100 to 4000 $m^2/cc$ with from about 100 to 500 $m^2/cc$ being preferred.

The components of the second sheet are present in the initial admixture in from about 5 to 35 (preferably 10–20) volume percent polyolefin, from about 25 to 70 (preferably 30–60) volume percent of inert filler, and from about 20 to 60 (preferably 30–50) volume percent of plasticizer. The resultant sheet after removal of plasticizer is a substantially homogeneous composition of from 7–35 weight percent polyolefin, from 50–93 weight percent filler and from 0–15 weight percent plasticizer.

The initially formed admixture for forming each first and second sheet may further contain conventional stabilizers, antioxidants, wetting agents, processing aids or mixtures thereof. Representative of stabilizers are 4,4-thiobis(6-tertbutyl-m-cresol) sold commercially under the tradename "Santonok" and 2,6-ditert-butyl-4-methylphenol sold commercially under the tradename "Ionol". Examples of known commercially available wetting agents include sodium alkyl benzene sulfonate, sodium lauryl sulfate, dioctyl sodium sulfosuccinate, and isooctyl phenyl polyethoxy ethanol. Processing aids include stearates and the like.

Each of the first and second sheets can be formed in substantially the same manner. The components of the respective sheets can be blended by conventional means to produce substantially uniform admixtures. For example, the components can be premixed at room temperature and then fluxed in a conventional mixer, such as a Banbury or sigma blade mixer or the like at moderate temperatures of from about 25° to 170° C. Temperatures of from 120° C. to 160° C. are normally suitable. Each admixture can be initially shaped and formed into thin sheets of less than about 50 mils and preferably less than about 20 mils. The total thickness of the resultant electrode product should not exceed about 60 mils. The sheets can be formed using conventional equipment such as by extrusion, calendering, injection molding or compression molding to process the admixtures into desired sheets. In a preferred embodiment, a first sheet and a second sheet can be concurrently formed by coextrusion and placed in intimate contact through the use of nip rollers or the like to form a unitary sheet product composed of one first sheet and one second sheet. It is preferred that the first sheet and second sheet be combined into a unitary sheet product prior to extraction of the plasticizer(s) used. The formation can be readily accomplished at moderate operating conditions, including low temperatures of from about 25° to 175° C. These conditions permit utilization of components normally deemed unsuitable in forming cathodic electrodes by presently known methods.

The sheet product described hereinabove can be used in forming a unique cathodic electrode product suitable for use in a non-aqueous battery system. The sheet product must be placed in contact with a conventional current collector in a manner to cause the first sheet component of the sheet product to be in intimate contact with the current collector. The current collector is normally in the form of a screen, grid, foil, woven or non-woven fabric, expanded metal or the like formed from an efficient electron conductive material such as carbon or metals as copper, aluminum, nickel, steel, lead, iron, or the like. Contacting of the collector with the sheet product is normally done by pressing or passing the materials through nip rollers or the like to cause the collector to be sufficiently embedded in the first sheet component to remain in intimate contact thereafter. It is preferred to embed the current collector in the first sheet prior to further contact with a second sheet components.

The current collector can be positioned to be in contact with a first sheet of a sheet product described above for use as the single cathodic electrode of a cell or can be positioned between two first sheets or two sheet products so that the first sheet of each sheet product is in face to face and in intimate contact with the collector. In both cases the resultant sandwiched product will thus have a second sheet on each exposed major surface. Alternately, a single sheet product and a single second sheet can have a current collector placed between them (again with the collector being adjacent to the first sheet of the sheet product) and pressed together to form a sandwiched product.

The plasticizer component of each sheet can be extracted, as described below, from each individual sheet, from each sheet product or subsequent to the lamination of the sheet product with a current collector and where appropriate with another sheet product or second sheet. It is most preferred that the extraction be conducted after lamination has been completed as, it is believed, that this aids in the formation of a unitary product of superior quality.

Although one or more of the sheets used in forming the present sheet product and electrode product can be subjected to extraction processing prior to being united with other sheets to form the final (sheet or electrode) product, it is preferred to conduct extraction subsequent to forming the final product, most preferably subsequent to forming the electrode product. It is believed, although not meant to be a limitation on the claimed invention, that the presence of plasticizer provides a further aid in having the resultant electrode product be a substantially fused and unitary structure. The plasticizer provides a conduit which permits the polymers of each sheet to migrate at the sheets interface to provide a resultant product of an integral, unitary polymer matrix.

The procedure for extraction of the plasticizer component from each sheet is well known and is not meant to form a part of the present invention, per se. The procedure shall be discussed herein with respect to extraction of plasticizer from an electrode product which is the preferred embodiment. The solvent(s) and extraction conditions should be chosen so that the polyolefin and filler of each second sheet and the polyethylene and electrically conductive and electrochemically active particulate material of each first sheet are essentially insoluble. Where the plasticizer used to form each sheet is the same material or has substantially the same solubility characteristics, one can use a single stage extraction. However, if plasticizer components of different solubility characteristics are used (either as part of forming a single sheet or for different sheets) a multiple stage extraction may be required. Numerous solvents can be used to cause removal of the plasticizer with the particular solvent(s) depending upon the particular plasticizer material to be removed. For example, when petroleum hydrocarbon oil is to be extracted, the following solvents are suitable; chlorinated hydrocarbons, such as trichloroethylene, tetrachloethylene, carbon tetrachloride, methylene chloride, tetrachloroethane, etc; hydrocarbon solvents such as hexane, benzene, petroleum ether, toluene, cyclohexane, gasoline, and the like. The extraction temperature can range anywhere from room temperature up to the melting point of the polyolefin as long as the polyolefin does not dissolve. It is preferred to have the extraction conducted at moderate temperatures of from 25° to 175° C. The time of the extraction will vary depending upon the temperature used and the nature of the plasticizer being extracted. For example, when a higher temperature is used, the extraction time for an oil of low viscosity may be only a few minutes, whereas if the extraction is performed at room temperature, the time requirement for a high molecular weight plasticizer may be in order of several hours.

The sheet product and the electrode product are substantially unitary structures which is believed due to the nature of the materials used, the requirement to have a plasticizer present in at least some of the sheets used to form the electrode product and the forces the components undergo during formation of the product. The electrode product has substantially no distinct interface boundary between the sheet components used in its formation and can be viewed as a gradient change across the electrode product's thickness or cross-section with the outer portion being an inert (with respect to the cathodic and anodic electrochemically active materials, the electrolyte and its carrier) portion and the inner body being cathodic active. The electrode product has microsporosity throughout its body. The nature of the porosity (average pore size diameter and/or pore volume) may vary from outer to inner portion and is preferably of a larger mean diameter and/or pore volume in the outer, inert portion and of smaller values in the inner, cathodic segment. Void volumes of the final sheet product may range from about 15 volume percent to about 60 volume percent with from about 25 to 45 volume percent being preferred. The sheets void volume is of a microporous character which generally have narrow distribution and are of low mean diameter (i.e. 0.05 to 0.5 microns) and can be determined by standard mercury intrusion techniques.

The ability to form the unitary structure may be (the theories discussed herein with respect to the structure of the subject electrode product are not meant to be a limitation on the present invention but only a means of describing the present invention so as to be fully understood by those skilled in this art) due to the nature of the polymer used in each sheet component. The close chemical nature of the polymers and their compatibility permits them to readily migrate from one sheet into an adjacent sheet. The plasticizer component(s) also aid in providing a unitary structure. The presence of a plasticizer, especially where it is common to all sheets or at least where there is common solvency, causes the polymer to migrate and intermesh the sheets when they are in contact. Additionally, the movement of the plasticizer as it is being removed from the product further forces the polymers to flow further enhancing the unitary nature of the resultant product.

In a further embodiment of the subject invention, a sheet product is formed from a first sheet and a second sheet wherein each sheet has certain predetermined length and breadth dimensions. At least one dimension and preferably both dimensions of the first sheet are less than those of the second sheet so that when the first and second sheets are placed against one another and caused to fuse together it provides a sheet product in which the second sheet extends beyond the dimension of the first sheet with the first sheet substantially centered therebetween. When this initially formed sheet product is used to form an electrode product, it can be used with either a second sheet or another sheet product having a second sheet which has substantially the same dimensions as the second sheet of the initially formed sheet product. The electrode product thus formed will have the first sheet(s) substantially encapsulated within second sheets which form the outer major surfaces of the electrode product. Alternately, a second sheet can be wrapped around a first sheet to envelope the first sheet therein. This can be readily done with the present material as they exhibit a high degree of flexibility and mechanical strength. The current collector will be in contact with the first sheet and extend beyond at least one edge of the electrode product as a contact means.

The resultant electrode product of the present invention is a substantially unitary product having flexibility and good tensile properties. It is capable of being readily formed under substantially anhydrous condition which, in turn, provides it with high stability when used in conjunction with a light metal, such as lithium. The resultant electrode product can be placed adjacent to anodic electrodes without the need of a separate insulating element and inhibits dendrite formation between cathodic and anodic elements of the battery. In addition it has been observed that the present electrode product is capable of undergoing a large amount of charge/discharge cycles to aid in providing an effective battery system.

The following examples are given for illustrative purposes only and are not meant to be a limitation on the invention as defined by the claims appended hereto. All parts and percentages are by weight unless otherwise specified.

The electronic conductivity of the subject compositions which are given in the examples below were measured with a conventional conductivity bridge by placing a nickel metal clamp on each of the two opposite ends of the specimen to be tested in such a manner as to have a free sample spacing of 1 cm by 1 cm not covered by the clamps. The thickness of the samples were measured. The clamps were connected to a conventional conductivity bridge and the resistance of the samples were measured. To check the accuracy of the measurements, the clamps were adjusted to a spacing of 2 cm by 1 cm and the resistance remeasured.

EXAMPLE I

A. A first or active sheet was formed by mixing 8 parts of high density polyethylene of a weight average molecular weight of 250,000 with 19 parts of low aromatic petroleum hydrocarbon oil (Sunthene 255; density of 0.89 g/ml, 54 ssu at 210° F., flash point of 390° F.), 13 parts of Shawinigian processed carbon black (50% compressed acetylene black, 45 millimicron, apparent density of 0.1 g/cc, 70 m$^2$/g BET surface area) 4 parts graphitic carbon and 62 parts of a commericial battery grade TiS$_2$ (average particle size of 15 microns).

The mixture was placed in a Brabender blender maintained at a temperature of 150° C. and mixed for about 5 minutes until steady torque is obtained. A nitrogen atmosphere was maintained over the equipment.

A sample of the resultant composition was hot pressed at a pressure of about 250 psi at a temperature of 150° C. for approximately 10 seconds to produce a uniform sheet of about 2 mils. thickness. The electronic conductivity of samples of the formed sheet, measured at 22° C. and 1 KHz, was 0.8 ohm$^{-1}$ cm$^{-1}$.

Two samples of the sheet formed above (each 0.7 cm×1.5 cm×2.2 mil. thick) were placed on each side of an expanded nickel metal screen and the composite was pressed at 150° C. and about 150 psi to form a sheet 5 mils. thick with only a single nickel wire welded to the screen left exposed.

B. A second or passive sheet was formed by mixing 15 parts high density polyethylene of a weight average molecular weight of 250,000, 49 parts of TiO$_2$ (BET surface area of 50 m$^2$/g), 25 parts of a low aromatic petroleum hydrocarbon oil (Sunthene 255) and 0.1 part of commercial antioxidant (Santonox). The mixture was placed in a Brabender blender maintained at 150° C. and mixed for about 6 minutes. A sample of the formed composition was pressed between two sheets of Mylar at 150° C. and 250 psi to give a 2 mil. thick sheet. The electronic conductivity of this sheet was measured at 22° C. and 1 KHz and determined to be negligable as it was not registerable at the lowest level of the bridge (4×10$^{-6}$ ohm$^{-1}$ cm$^{-1}$).

EXAMPLE II

Two pieces of the passive sheet formed according to Example I B, above, were placed on each major surface of the active TiS$_2$ sheet formed according to Example I A, above, in a manner to have the passive sheets extend beyond the edges of the active sheet by 2 millimeters on all edges. The composite was pressed at 150° C. and about 25–50 psi for about 1 minute. The resultant sheet product was immersed in cyclohexane bath for 3 periods of 10 minutes each to yield a microporous sheet. The resultant electrode product was examined and had a fused unitary structure about 9.5 mils. thick with a surface composition of 23 percent polyethylene, 76 percent TiO$_2$, less than 1 percent oil and approximately 45 percent porosity. The two surfaces were separated by an inner core having a composition of 9.2 percent polyethylene, 19.5 percent combined carbon, 71 percent TiS$_2$ and less than 1 percent oil with 36 percent porosity and having the nickel screen embedded therein.

EXAMPLE III

The electrode product of Example II was placed into an Argon atmosphere glove box for assembly as part of a cell with a lithium foil of 1 cm$^2$ and 2 mil. thickness supported on an expanded nickel screen which had a nickel wire extending therefrom. The electrode product and the lithium foil were positioned adjacent one another and placed into a rectangular glass container. The container was filled with a solution of 1.2M LiAsF$_6$ in 2-methyl tetrahydrofuran and sealed with an O ring seal, taken out of the Argon box and permenantly heat sealed leaving the nickel wires exposed to produce a Li-TiS$_2$ cell. The cell was discharged at 2 mA to a cut-off voltage of 1.5 volts and was charged at 1 mA to an upper voltage of 2.5 volts. The utilization of the 1.7 mAh (TiS$_2$ limited) cell was 79% at Cycle No. 5, 73% at Cycle No. 100 and 50% at Cycle No. 160.

EXAMPLE IV

A cathodic sheet product was formed by placing two 4 mil. sheets, formed from the same composition as described in Example I A above, on each side of an expanded nickel screen and then pressing the composite as described in Example I A (first sheet). A 2 mil. second sheet formed from the composition of Example I B was folded around the first sheet in a manner to leave 2 mm excess of the second sheet on all edges. Light pressure of about 25 psi was applied with a plate press at 150° C. to effect fusing of the sheets and the edge portions to themselves. The sheet product was immersed in a cyclohexane bath for three 10 minute periods to extract the oil component. The resultant cathodic sheet product was put into an Argon atmosphere glove box. A Li-TiS$_2$ cell was fabricated by spirally winding the formed cathodic sheet product directly with a 2×7 cm. 5 mil. lithium foil which is supported on an expanded nickel screen. The jelly roll electrodes were placed in a glass tube container which was then filled with 865 mg of an electrolyte solution composed of 1.2M LiAsF$_6$ in tetrahydrofuran. The container was sealed with an O ring seal, removed from the Argon box and permanently glass sealed.

This example represents the ease and ability of the subject cathodic sheet product to be readily manipulated and formed into a complex configuration and to form a cell without the utilization of additional components such as a separator membrane or the like. The cell was cycled between 2.5 and 1.5 volts at a discharge current of 70 mA and a charging current of 30 mA. The utilization of the 100 mAh (TiS$_2$ limited) cell was 72 percent after six cycles and 43 percent after 139 cycles.

EXAMPLE V

An inert portion of a cathodic electrode was formed from an initial composition comprising 12 parts of polyethylene (MW$_w$=250,000), 31 parts hydrocarbon oil (Sunthene 255), 23 parts silica (Hisil 233; BET surface area of 110 m$^2$/g) and 0.1 part antioxidant (Santonox). A sheet (2 mil. thick) formed from this composition was folded around and fused to an active sheet of Example I A and then treated with cyclohexane, all in the manner described in Example IV above, to provide a unitary electrode product in which the active component is sealed in and forms the core of the product. A Li-TiS$_2$ cell was formed using the cathodic electrode product and 7 mg 5 mil. lithium foil in the manner described in Example III, above. The cell was cycled with a discharge to 1.5 volts at 2 mA and charged to 2.5 volts at 1 mA. The capacity utilization of the theoretical 2.9 mAh (TiS$_2$ limited) was 76 percent after the sixth Cycle, 65 percent after the one hundreth Cycle and 50 percent at Cycle No. 200.

EXAMPLE VI

A cathodic sheet product was formed by a core having a composition comprising a mixture of 5 parts of high density polyethylene having a weight average molecular weight of 3 million, 23 parts of hydrocarbon oil (Sunthene 255), 10 parts of Shawinigian processed carbon black (45 millimicron, apparent density of 0.1 g/cc/70 m$^2$/g BET surface area), 3 parts graphitic carbon and 65 parts of a commercial battery grade TiS$_2$ (average particle size of 15 microns). This composition was formed into a sheet at 165° C. and 250 psi. The sheet was then encompassed in a passive composition of Example I B and readily fused into a unitary structure which was treated with cyclohexane in the manner described in Example II. The core of the product was 6 percent polyethylene, 16 percent combined carbon, and 78 percent TiS$_2$ and had about 45 percent porosity. The surfaces of the product was 23 percent polyethylene, 76 percent TiO$_2$ and less than 1 percent oil with about 45 percent porosity.

The above electrode product was used to form a Li-TiS$_2$ cell in the same manner as described in Example III, above. The cell was cycled between 2.6 and 1.6 volts at a discharge/charge current of 2 mA/1 mA respectively. The utilization of the 3 mAh (TiS$_2$ limited) cell was 61 percent after Cycle 5 and 54 percent after Cycle 35.

EXAMPLE VII

The procedure of Example I A was repeated except that the TiS$_2$ was replaced with 55 parts of vanadium oxide (V$_2$O$_5$, 200 mesh, 99.9 percent pure). The resultant sheet had a conductivity of 0.4 ohms$^{-1}$ cm$^{-1}$. An 8 mil. thick V$_2$O$_5$ active sheet was formed having a nickel screen embedded therein.

A cathodic electrode was formed according to the procedure of Example V using the above V$_2$O$_5$ active sheet and the sheet material of Example I B and was treated with cyclohexane as described in Example II.

The cathodic electrode described above was placed against a 5 mil. lithium foil and formed into a Li-V$_2$O$_5$ cell by the procedure described in Example III, disclosed above. The cell has a theoretical V$_2$O$_5$ limited capacity of 5.5 mAh (based on the reaction 2Li+V$_2$O$_5$⇌Li$_2$V$_2$O$_5$). The cell was discharged to 2 V at 1 mA and charged at 0.5 mA to 3 V. Capacity utilization (% of theoretical) was 100 at Cycle No. 1, 82 at Cycle No. 3, 49 at Cycle No. 5 and 40 at Cycle No. 25.

We claim:

1. An electrode product comprising a substantially unitary, microporous structure having a first and a second major surface and a thickness of less than about 50 mils, each of said first and second major surface and a thickness adjacent to each major surface composed of a substantially homogeneous outer composition of from about 7 to 35 weight percent of a polyolefin having a weight average molecular weight of at least about 100,000, from about 50 to 93 weight percent of an inert filler having a mean particle size of from about 0.01 to 10 microns and from 0 to about 15 weight percent of an organic plasticizer for said polyolefin, each of the first and second major surface outer composition being separated by a thickness composed of a substantially homogeneous core composition of from about 2–30 weight percent polyethylene of a weight average molecular weight of at least about 150,000, from 70–98 weight percent of electrically conductive and electrochemically active particulate material and from 0 to about 5 weight percent of an organic plasticizer for said polyethylene and a current collector of electronically conductive material in contact with said particulate material.

2. The electrode product of claim 1 wherein the particulate material has a mean particle size of about 25 microns or less and is composed of from about 70 to 100 weight percent of at least one metal chalcogenide of a metal selected from titanium, zirconium, hafnium niobium, tantalum, molybdenum, vanadium and mixtures thereof and from 0 to about 30 weight percent of a conductive carbon black.

3. The electrode product of claim 1 wherein the particulate material is at least 70 weight percent titanium disulfide.

4. The electrode product of claim 1 wherein the polyethylene is present in 2-15 weight percent and has a weight average molecular weight of from about 200,000 to 500,000, the particulate material is present in 85-98 weight percent and is at least about 70 weight percent titanium disulfide, the plasticizer for the polyethylene is present in from 0-5 weight percent and is selected from a petroleum oil, the polyolefin is present in from 7-50 weight percent and has a weight average molecular weight of from 150,000 to 500,000, the inert filler is selected from titania, alumina, silica and the polyolefin plasticizer is a petroleum oil.

5. The electrode product of claim 1 wherein said structure further comprises edge portions composed substantially of said outer composition.

6. The electrode product of claim 2 wherein said structure further comprises edge portions composed substantially of said outer composition.

7. The electrode product of claim 3 wherein said structure further comprises edge portions composed substantially of said outer composition.

8. The electrode product of claim 4 wherein said structure further comprises edge portions composed substantially of said outer composition.

9. In a secondary battery comprising at least one pair of electrodes of opposite polarity, and an electrolyte and wherein said anodic electrode is composed of an alkali metal or alloy thereof, the improvement comprises that said cathodic electrode consists essentially of the electrode product of claim 1.

10. In a secondary battery comprising at least one pair of electrodes of opposite polarity, and an electrolyte and wherein said anodic electrode is composed of an alkali metal or alloy thereof, the improvement comprises that said cathodic electrode consists essentially of the electrode product of claim 2.

11. In a secondary battery comprising at least one pair of electrodes of opposite polarity, and an electrolyte and wherein said anodic electrode is composed of an alkali metal or alloy thereof, the improvement comprises that said cathodic electrode consists essentially of the electrode product of claim 3.

12. In a secondary battery comprising at least one pair of electrodes of opposite polarity, and an electrolyte and wherein said anodic electrode is composed of an alkali metal or alloy thereof, the improvement comprises that said cathodic electrode consists essentially of the electrode product of claim 4.

13. In a secondary battery comprising at least one pair of electrodes of opposite polarity, and an electrolyte and wherein said anodic electrode is composed of an alkali metal or alloy thereof, the improvement comprises that said cathodic electrode consists essentially of the electrode product of claim 5.

14. In a secondary battery comprising at least one pair of electrodes of opposite polarity, and an electrolyte and wherein said anodic electrode is composed of an alkali metal or alloy thereof, the improvement comprises that said cathodic electrode consists essentially of the electrode product of claim 6.

15. In a secondary battery comprising at least one pair of electrodes of opposite polarity, and an electrolyte and wherein said anodic electrode is composed of an alkali metal or alloy thereof, the improvement comprises that said cathodic electrode consists essentially of the electrode product of claim 7.

16. In a secondary battery comprising at least one pair of electrodes of opposite polarity, and an electrolyte and wherein said anodic electrode is composed of an alkali metal or alloy thereof, the improvement comprises that said cathodic electrode consists essentially of the electrode product of claim 8.

17. An electrode product comprising a substantially unitary, microporous structure having a first and a second major surface and a thickness of less than about 50 mils said first major surface and adjacent thickness composed of a substantially homogeneous composition of from about 2-30 weight percent polyethylene having a weight average molecular weight of at least about 150,000, from 70-98 weight percent of electrically conductive and electrochemically active particulate material and from 0 to about 5 weight percent of an organic plasticizer for said polyethylene, and said second major surface and adjacent thickness composed of from about 7 to 35 weight percent of a polyolefin having a weight average molecular weight of at least 100,000, from 50-93 weight percent of an inert filler having a mean particle size of less than about 0.01 to 10 microns and from 0-15 weight percent of an organic plasticizer for said polyolefin.

18. The electrode product of claim 17 wherein the particulate material has a mean particle size of about 25 microns or less and is composed of at from about 70 to 100 weight percent of at least one metal chalcogenide of a metal selected from titanium, zirconium, hafnium niobium, tantalum, molybdenum, vanadium and mixtures thereof and from 0 to about 30 weight percent of a conductive carbon black.

19. The electrode product of claim 17 wherein the particulate material is at least 70 weight percent titanium disulfide.

20. The electrode product of claim 17 wherein the polyethylene is present in 2-15 weight percent and has a weight average molecular weight of from about 200,000 to 500,000, the particulate material is present in 85-98 weight percent and is at least about 70 weight percent titanium disulfide, the plasticizer for the polyethylene is present in from 0-5 weight percent and is selected from a petroleum oil, the polyolefin is present in from 7-50 weight percent and has a weight average molecular weight of from 150,000 to 500,000, the inert filler is selected from titania, alumina, silica and the polyolefin plasticizer is a petroleum oil.

* * * * *